United States Patent [19]
Engel

[11] Patent Number: 4,974,169
[45] Date of Patent: Nov. 27, 1990

[54] NEURAL NETWORK WITH MEMORY CYCLING

[75] Inventor: Stephen J. Engel, E. Northport, N.Y.

[73] Assignee: Grumman Aerospace Corporation, Bethpage, N.Y.

[21] Appl. No.: 298,406

[22] Filed: Jan. 18, 1989

[51] Int. Cl.⁵ .............................................. G06F 15/18
[52] U.S. Cl. .................................................... 364/513
[58] Field of Search ................ 364/513, 200, 300, 900

[56] References Cited

U.S. PATENT DOCUMENTS

| | | | |
|---|---|---|---|
| 3,950,733 | 4/1976 | Cooper et al. | 364/200 |
| 4,044,243 | 8/1977 | Cooper et al. | 364/900 |
| 4,254,474 | 3/1981 | Cooper et al. | 364/900 |
| 4,326,259 | 4/1982 | Cooper et al. | 364/900 |

Primary Examiner—Allen MacDonald
Attorney, Agent, or Firm—Scully, Scott Murphy & Presser

[57] ABSTRACT

An information processing system and method to calculate output values for a group of neurons. The method comprises transmitting input values for the neurons to a memory unit of a processing section, and then calculating a multitude of series of neuron output values over a multitude of cycles. During a first period of each cycle, a first series of neuron output values are calculated from neuron input values stored in a first memory area of the memory unit; and during a second period of each cycle, a second series of neuron output values are calculated from neuron input values stored in a second memory area of the memory unit. The transmitting step includes the steps of storing in the first memory area of the memory unit, neuron input values transmitted to the memory unit during the period immediately preceding the first period of each cycle; and storing in the second memory area of the memory unit neuron input values transmitted to the memory unit, during the first period of each cycle.

20 Claims, 9 Drawing Sheets

FIG. 4

| BROADCAST DATA VALUE | IDENTIFYING GLOBAL ADDRESS | ADDRESS IN EACH MEMORY AREA AT WHICH THE DATA VALUE IS TO BE STORED | NEURON INPUTS TO WHICH THE DATA VALUE IS TO BE APPLIED |
|---|---|---|---|
| $V_1$ | $a_1$ | $A_1$ | $N1_2'$ $N2_1'$ $N3_1'$ |
| $V_2$ | $a_2$ | $A_2$ | $N1_3'$ $N2_2'$ $N3_2'$ |
| $V_3$ | $a_3$ | $A_3$ | $N1_4'$ $N2_3'$ $N3_3'$ |
| $V_4$ | $a_4$ | $A_4$ | $N4_1'$ $N5_2'$ $N6_1'$ |
| $V_5$ | $a_5$ | $A_5$ | $N4_2'$ $N5_3'$ $N6_2'$ |
| $V_6$ | $a_6$ | $A_6$ | $N4_3'$ $N5_3'$ $N6_3'$ |
| $V_7$ | $a_7$ | $A_7$ | $N1_1'$ $N5_1'$ |
| $V_8$ | $a_8$ | $A_{10}$ | |
| $V_9$ | $a_9$ | $A_{10}$ | |
| $V_{10}$ | $a_{10}$ | $A_{10}$ | |

| NEURON INPUT | ASSOCIATED OPERATION COUNT NUMBER | ADDRESS IN EACH MEMORY AREA AT WHICH THE NEURON INPUT VALUE IS STORED |
|---|---|---|
| $N1_1$ | 1 | $A_7$ |
| $N1_2$ | 2 | $A_1$ |
| $N1_3$ | 3 | $A_2$ |
| $N1_4$ | 4 | $A_3$ |
| – | 5 | |
| $N2_1$ | 6 | $A_1$ |
| $N2_2$ | 7 | $A_2$ |
| $N2_3$ | 8 | $A_3$ |
| – | 9 | |
| $N3_1$ | 10 | $A_1$ |
| $N3_2$ | 11 | $A_2$ |
| $N3_3$ | 12 | $A_3$ |
| – | 13 | |
| $N4_1$ | 14 | $A_4$ |
| $N4_2$ | 15 | $A_5$ |
| $N4_3$ | 16 | $A_6$ |
| – | 17 | |
| $N5_1$ | 18 | $A_7$ |
| $N5_2$ | 19 | $A_4$ |
| $N5_3$ | 20 | $A_5$ |
| $N5_4$ | 21 | $A_6$ |
| – | 22 | |
| $N6_1$ | 23 | $A_4$ |
| $N6_2$ | 24 | $A_5$ |
| $N6_3$ | 25 | $A_6$ |
| – | 26 | |

FIG.5

| NEURON INPUT | ASSOCIATED DATA TRANSFER VALUE | ADDRESS IN THE WIEGHT MEMORY UNIT AT WHICH THE DATA TRANSFER VALUE IS LOCATED | ASSOCIATED OPERATION COUNT NUMBER |
|---|---|---|---|
| $N1_1$ | $W_1$ | 1 | 1 |
| $N1_2$ | $W_2$ | 2 | 2 |
| $N1_3$ | $W_3$ | 3 | 3 |
| $N1_4$ | $W_4$ | 4 | 4 |
| | | | 5 |
| $N2_1$ | $W_5$ | 6 | 6 |
| $N2_2$ | $W_6$ | 7 | 7 |
| $N2_3$ | $W_7$ | 8 | 8 |
| | | | 9 |
| $N3_1$ | $W_8$ | 10 | 10 |
| $N3_2$ | $W_9$ | 11 | 11 |
| $N3_3$ | $W_{10}$ | 12 | 12 |
| | | | 13 |
| $N4_1$ | $W_{11}$ | 14 | 14 |
| $N4_2$ | $W_{12}$ | 15 | 15 |
| $N4_3$ | $W_{13}$ | 16 | 16 |
| | | | 17 |
| $N5_1$ | $W_{14}$ | 18 | 18 |
| $N5_2$ | $W_{15}$ | 19 | 19 |
| $N5_3$ | $W_{16}$ | 20 | 20 |
| $N5_4$ | $W_{17}$ | 21 | 21 |
| | | | 22 |
| $N6_1$ | $W_{18}$ | 23 | 23 |
| $N6_2$ | $W_{19}$ | 24 | 24 |
| $N6_3$ | $W_{20}$ | 25 | 25 |

FIG.6

NEURAL NETWORK WITH MEMORY CYCLING

BACKGROUND OF THE INVENTION

This invention generally relates to data processing systems, and more specifically, to such systems that simulate neural systems or networks.

Neural networks are designed to simulate, in a very simplified way, the operation of the human brain; and in a neural network, a multitude of input values are applied to a multitude of processing elements, referred to as neurons. For instance, a particular input value may be applied to one, several, or all of the neurons of the network; and a particular neuron may receive one, several, or all of the input values of the network as well as output values of other neurons in the network. Typically, each input value of each neuron is given a weight, and each neuron generates an output value that is a function of the sum of its weighted input values. The weight that is given to a particular input value by a particular neuron is determined by a data transfer function, which may be constant or which may vary over time.

A data processing system having just one processor, or a small number of processors, may be programmed to simulate the operation of a neural network, and in particular to do the same calculations and to generate the same output values as a neural network. More specifically, in a neural network, a multitude of sets of input values are conducted to a multitude of neurons, and each neuron processes a respective one set of input values according to a particular algorithm to generate a respective output value. In a data processing system designed to simulate a neural network, a multitude of sets of input values may be transmitted to just one processor but over a multitude of time periods; and the processor processes each set of input values over a respective one period of time according to a particular algorithm to generate an output value from each set of input values.

For example, in a neural network, a first set of input values may be applied to a first neuron, which processes these input values according to a first algorithm to produce a first output value; a second set of input values may be applied to a second neuron, which processes these input values according to a second algorithm to produce a second output value; and a third set of input values may be applied to a third neuron, which processes these input values according to a third algorithm to produce a third output value. In a data processing system designed to simulate the neural network, the first set of input values is transmitted to a processor over a first period of time, and the processor processes these input values according to the first algorithm to produce the first output value; the second set of input values is transmitted to that same processor but over a second period of time, and the processor processes these input values according to the second algorithm to produce the second output value; and the third set of input values is transmitted to the processor over a third period of time, and the processor processes these input values according to the third algorithm to produce the third output signal.

As a general rule, when the number of neurons in a neural network is increased, the network can handle more complex tasks and can better simulate human thinking. Thus, considerable attention has been given to designing neural networks having large numbers of neurons; and for example, neural networks have been designed with several thousand neurons.

A neural network having a large number of neurons may involve an extremely large number of calculations. Commonly, each input value of a network is applied to most or even all of the neurons of the network, so that calculating one complete series of neuron output values in a network having 200 input values and 200 neurons might require as many as 40,000 calculations. An additional 40,000 calculations might be needed, for just that one series of neuron output values, if the 200 neuron output values are fed back to all 200 neurons as additional input values. Further, with many neural network models, the output values are determined by differential equations whose solutions are a function of time. In these models, solutions are typically approximated by iteratively solving for the state of the network over discrete time intervals. Several iterations, and sometimes hundreds of iterations, are usually required to determine a stable solution for the network output values.

The processor or processors of any data processing system that would simulate a neural network having such a large number of input values and neurons would be required to perform an enormous number of calculations each time a series of neuron output values is generated. Even with high speed electronic data processing equipment, this huge number of calculations limits the speed at which the desired output values can be generated, and this limits the effectiveness with which the data processing system can simulate neuromorphic or neural networks.

SUMMARY OF THE INVENTION

An object of the present invention is to improve the effectiveness with which data processing systems can simulate neural networks.

Another object of this invention is to use a data processing system to simulate a neural network, and to increase the speed at which the data processing system can generate the desired output values.

A further object of this invention is to provide a data processing system for circulating a neural network with a multitude of state memories, and to coordinate the operation of these memories to increase the speed with which the system can process successive sets of neuron output values.

Still another object of the present invention is to simulate a neural network with a data processing system having a multitude of sections, each of which has a plurality of state memories, and to alternate the functions of these state memories of each section in a regular, cyclical manner so that, in each section, while one of the state memories is being used to supply neuron input values needed to calculate one series of neuron output values, another of the state memories is being used to store neuron input values needed to calculate the next series of neuron output values.

These and other objectives are attained with an information processing method and system to calculate output values for a group of neurons. Generally, the method comprises transmitting input values for the neurons to a memory unit of a processing section, and then calculating a multitude of series of neuron output values over a multitude of cycles. More specifically, during a first period of each cycle, a first series of neuron output values are calculated from neuron input values stored in a first memory area of the memory unit, and during a second period of each cycle, a second series of neuron output values are calculated from neuron input values stored in a second memory area of the memory unit. Neuron input values transmitted to the memory unit during the period immediately preceding the first period of each cycle, and that are used during that first period to calculate the first series of neuron output values, are stored in the first memory area of the memory unit; and neuron input values transmitted to the memory unit during the first period of each cycle and that are used during the second period of the cycle to calculate the second series of neuron output values, are stored in the second memory area of the memory unit.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 4 is a table that lists several values that are broadcast to the processing sections of the processing system, identifying subaddresses for these values, and addresses at which, these values are stored in the processing section of FIG. 3.

FIG. 5 is a table that lists all of the inputs of the neurons shown in FIG. 1, identifies operation count values associated with these neuron inputs, and identifies addresses of values to be applied to the neuron inputs.

FIG. 6 is a table that lists all of the data transfer values that are to be applied to the neuron inputs, identifies the operation count values associated with these data transfer values, and identifies addresses for the data transfer values.

DETAILED DESCRIPTION OF THE PREFERRED EMBODIMENTS

Figure 1:
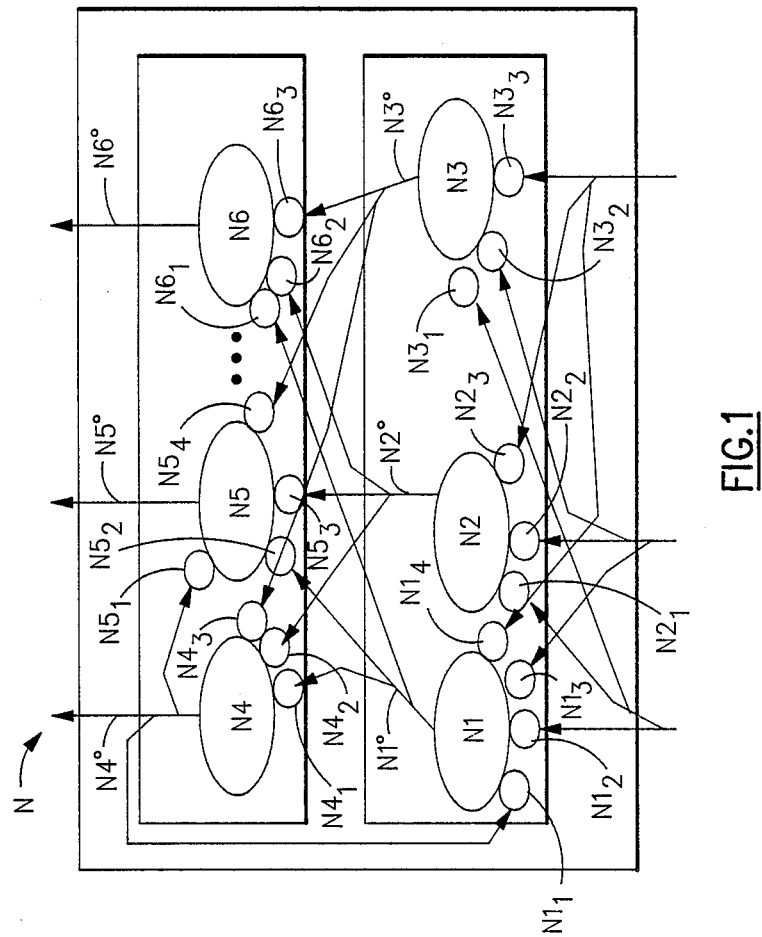
FIG. 1 schematically depicts a neural network.

The present invention is a data processing system and method for simulating a neural network, and FIG. 1 illustrates a neural network N comprising a multitude of neurons arranged in two layers, with each neuron having a multitude of inputs and one output. Six of the neurons are shown in FIG. 1 and referenced therein as N1–N6 respectively. The input of each neuron is identified in the same manner as the neuron but with an added numeric subscript, and the output of each neuron is identified in the same manner as the neuron but with the added superscript "o." Thus, for instance, neuron N1 has 4 inputs referenced as $N1_1$, $N1_2$, $N1_3$, and $N1_4$; neuron N2 has 3 inputs referenced as $N2_1$, $N2_2$, and $N2_3$; and neuron N3 has 3 inputs referenced as $N3_1$, $N3_2$, and $N3_3$; and the outputs of neurons N1, N2 and N3, for example, are referenced as $N1^o$, $N2^o$ and $N3^o$ respectively. With the arrangement shown in FIG. 1, the output of each of the neurons N1, N2 and N3 is used as an input to each of the neurons N4, N5 and N6, and the output of neuron N4 is used as an input to each of neurons N1 and N5.

Neural networks are employed to process a plurality of input signals or values according to predetermined algorithms to generate a plurality of output signals or values. These input values characterize an "event," which can be an optical event such as the sight of a pattern, an auditory event such as the hearing of a tone, or any other event such as the receipt of radiation signals from outer space. The only requirement for the event is that it be translatable in some way into a plurality of input values which retain sufficient detail about the event to be of interest. The input signals or values are typically generated by a translator which performs some kind of analysis of the event and produces signals in response to this analysis. As an example, if the input is an optical event or scene, the translator may divide the scene into a plurality of raster elements and produce values in proportion to the optical intensity at each respective raster element. If the input is an auditory event, the translator may perform a fourier analysis of the auditory information and produce values in proportion to the amplitude of sound at each of the fourier frequencies.

Figure 2:
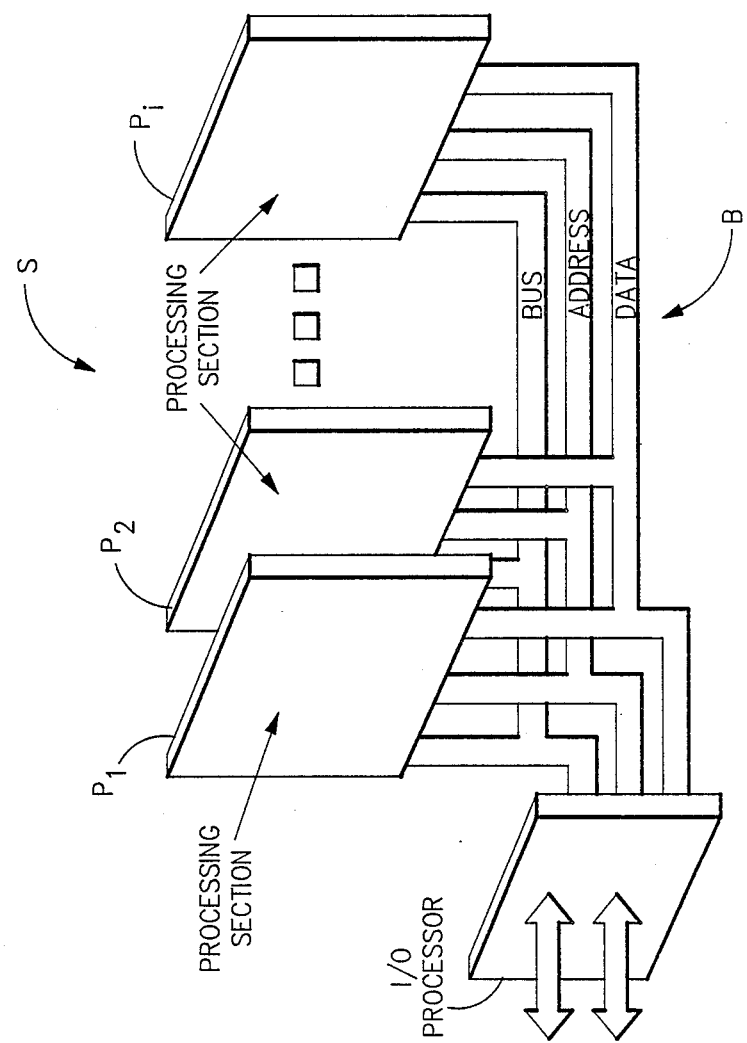
FIG. 2 schematically illustrates a data processing system according to the present invention.

FIG. 2 illustrates a data processing system S generally comprising input-output means, I/0, data transfer or broadcasting means B, and a plurality of processing sections $P_1$, $P_2$..., $P_i$. The input-output means is provided to receive input values and to transmit output data, and any suitable input-output means may be employed in the practice of this invention. For instance, the input-output means may include a translator, as described above which performs some kind of analysis of an event and produces appropriate signals in response to this analysis. The input-output means also includes suitable means to present the output of system S. For instance, if system S is utilized to identify visual patterns, the output of the system may be an alarm that advises the human operator when a particular pattern has, or has not, been detected. If system S is utilized as pure distributed memory, it may be coupled directly to a conventional digital computer to store the output values generated by the processing system.

The data transmission or broadcasting means is provided, first, to transmit or broadcast data between the input-output means and the processing sections of system S, and second, to transmit data and commands between these processing sections themselves. Any suitable data transmission or broadcasting means may be employed in system S; and, as shown in FIG. 2, the data transmission means preferably comprises three bus lines, each of which is connected to the input-output means and to each of the processing sections of system S. A first bus line, referred to as the data bus line, is used to broadcast data, such as neuron input and output values, to and between the processing sections $P_1 ... P_i$ of system S. A second bus line, referred to as the address bus line, is used to broadcast global addresses associated with the data being broadcast over the data bus. The third bus line, referred to as the bus arbitration bus, is used to broadcast bus control commands between the I/O means and the processing section $P_1 ... P_i$ to control the timing and sequence of the data and addresses broadcast over the other two buses. Any suitable bus control procedure may be employed with system S to broadcast data and addresses between the input-output means of the system and the processing sections thereof, and between the processing sections themselves.

Each processing section is used to calculate output values for a respective group of neurons of a neural network. For example, processing section $P_1$ shown in FIG. 2 may be used to calculate output values for neurons N1, N2, N3, N4, N5 and N6 of the neural network shown in FIG. 1. Processing section $P_2$ may be employed to calculate output values for another group of neurons (not shown in FIG. 1), and processing section $P_i$ may be used to calculate output values for still another group of neurons (also not shown in FIG. 1.)

In the operation of processing system S, input values for the neurons of neural network N are broadcast to the processing sections $P_1 ... P_i$ via the data bus; and for instance, to calculate a complete set of neuron output values, a hundred or more input values may be broadcast to the processing sections. These neuron input values may be broadcast from the system input-output means, or from one of the processing sections of system S; and typically, each broadcast value is broadcast to all of the processing sections of system S. Many of these values are used as inputs to more than one neuron, and also, not every broadcast value is needed by each processing section.

For example, processing section $P_1$ needs seven values to calculate a series of neuron output values, and these values can be identified by the symbols $V_1 - V_7$ respectively. Three of these values, $V_1 - V_3$, are transmitted to processing section $P_1$ either from the system input-output means or from other processing sections of system S; while four of these values, $V_4 - V_7$ are neuron output values previously calculated by the processing section $P_1$. Value $V_1$ is used as neuron inputs $N1_2$, $N2_1$ and $N3_1$; value $V_2$ is used as neuron inputs $N1_3$, $N2_2$ and $N3_2$; and value $V_3$ is used as neuron input values $N1_4$, $N2_3$ and $N3_3$. The value $V_4$ is the previously calculated neuron output value $N1^0$, and this value is used as neuron inputs $N4_1$, $N5_2$ and $N6_1$; and value $V_5$ is the previously calculated neuron output value $N2^0$, and this value is used as neuron inputs $N4_2$, $N5_3$ and $N6_2$. The value $V_6$ is the previously calculated neuron output $N3^0$, and this value is used as neuron inputs $N4_3$, $N5_4$ and $N6_3$; and value $V_7$ is the previously calculated neuron output $N4^0$, and this value is used as neuron inputs $N1_1$ and $N5_1$.

Preferably, the processing sections $P_1 ... P_i$ are identical to each other, so only one, section $P_1$ shown in FIG. 3, will be described in detail. Generally, processing section $P_1$ includes global address map 12, primary memory unit 14, control unit 16, input map unit 18, weight memory unit 20, multiply accumulator unit 22, arithmetic processor 24 and processor memory unit 26. Processing section $P_1$ further includes first, second, third and fourth switching units 30, 32, 34 and 36 respectively, address input switch 40, change weight logic unit 42, post synaptic transfer unit 44, and pipeline registers $R_1-R_{10}$. Moreover, control unit 16 includes job table 50, clock 52 and counter 54; primary memory unit includes first, second and third memory areas 14a, 14b and 14c respectively; and multiply accumulator unit 22 includes excitory multiply accumulator member 56 and inhibitory multiply accumulator member 60.

Global address map 12 is provided to map values broadcast to processing section $P_1$ over the system data bus into associated locations in primary memory unit 14. More specifically, each value broadcast to the processing section over the system data bus is accompanied by an identifying signal or global address on the system address bus. The global address map monitors the system address bus; and when a global address is transmitted over that address bus, the global address map determines the proper address in the memory areas 14a, b and c for the accompanying data value being broadcast over the system data bus. The global address map then transmits an address to a selected one of the memory areas 14a, b and c identifying the address at which that accompanying data value is to be stored. That accompanying value is also transmitted to the selected memory area and stored therein at the proper address. The memory area that receives this address value from the global address map is determined by switch 40, and the memory area that receives the accompanying data value broadcast over the system data bus is determined by switch units 30, 32 and 34. As discussed in greater detail below, the memory area that is selected to receive this address and data value depends on where in its processing cycle section $P_1$ happens to be when that data value is broadcast to the processing section.

For example, the global address map may include a table listing all of the global addresses that may be broadcast to processing section $P_1$ and the address in each memory area 14a, b and c to which the accompanying data value is to be transmitted. A partial example of such a table is shown in FIG. 4. This table lists ten values, $V_1$ through $V_{10}$, that may be transmitted to processing section $P_1$, and the global addresses for these ten values are $a_1-a_{10}$ respectively. FIG. 4 identifies the location or address in each memory area 14a, b and c to which the listed values $V_1$ through $V_{10}$ are to be transmitted, and this table also identifies the neuron inputs to which values $V_1$ through $V_7$ are subsequently applied.

As previously mentioned, of the data values transmitted to processing section $P_1$, some values are used and some values are not used by that processing section in subsequent calculations. A respective one address is reserved in each memory area for each data value that is subsequently used by the processing section; and one, common address is reserved in each memory area for all of the data values that are not subsequently used by the processing section. Whenever one of these latter values is broadcast to processing section Pl, that data value is simple written into that common address in the then selected memory area, over the prior value stored at that common address. This erases that prior value, but since that value is not needed by the processing section, erasing that prior value does not effect the operation of the processing section.

Control unit 16, generally, controls the calculation of the neuron output values and various other functions or services performed by processing section $P_1$. To start a series of neuron output calculations, job table 50 transmits an enable signal to clock 52. If the clock is not already activated, this enable signal activates the clock, and thereafter, the clock normally generates pulses at regular intervals such as once every ten nanoseconds. These pulses are conducted to counter 54, which keeps track of the number of such pulses that have been generated by the clock since the current calculation period began. In particular, at the start of each such period, the counter has a value of zero, and this value is incremented by one each time a pulse is transmitted to the counter from the clock. The value of the counter is referred to as the operation count number; and each time this value is increased by one, the new operation count number is transmitted to input map 18, weight memory unit 20 and the job table itself.

Each neuron input is associated with a respective one operation count number. When an operation count number is transmitted to input map 18, if a neuron input is associated with that operation count, then the input map identifies the address in each memory area having the value that is to be applied to that neuron input. The input map then transmits a signal to a particular memory area identifying this address; and, in response, this particular memory area transmits to multiply accumulator unit 22, the value at this address. The particular memory area that receives this signal from the input map is determined by the state of switch unit 36; and also as discussed in detail below, the state of this switch unit depends on where in its processing cycle processing section $P_1$ happens to be when the signal is generated by the input map. For example, input map may include a table listing all of the inputs of the neurons N1 through N6, the operation count associated with each of these neuron inputs, and the address in each memory area having the value that is to be applied to each neuron input. An example of such a table is given in FIG. 5.

The neuron inputs may be associated with the operation count numbers in any suitable manner. For example, as shown in FIG. 5, each neuron is associated with a respective set of successive operation count numbers; and within each such set, the inputs of the neuron are associated with the operation count values according to the order in which values are applied to the neuron inputs. Thus, for instance, in the set of operation count numbers associated with neuron $N_1$, the neuron inputs $N1_1$, $N1_2$, $N1_3$ and $N1_4$ are associated with operation count numbers 1, 2, 3 and 4, respectively; and in the set of operation count numbers associated with neuron N2, the neuron inputs $N2_1$, $N2_2$ and $N2_3$ are associated with operation count numbers 6, 7 and 8 respectively.

Moreover, preferably, the neurons N1–N6 are associated with these sets of operation count numbers according to the order in which processor $P_1$ calculates the neuron output values. Thus, neuron N1, whose output is calculated first by the processing section, is associated with the first set of operation count numbers; neuron N2, whose output is calculated second by the processing section, is associated with the second set of operation count numbers; and neuron N3, whose output is calculated third by the processing section, is associated with the third set of operation count numbers. Preferably, adjacent sets of operation count numbers are separated by one operation count number, the purpose of which is discussed below.

Weight memory unit 20 has a respective one data transfer value for each neuron input, and preferably each data transfer value is stored in the weight memory unit at a respective one address. In particular, each neuron input and the associated data transfer value are both associated with the same operation count number. With this arrangement, the preferred method for weight memory addressing is to use the operation count directly for addressing, for example, as indicated in FIG. 6. This significantly reduces the amount of memory needed for unit 20. When an operation count number is transmitted to the weight memory unit, if a neuron input is associated with that operation count number, then the weight memory unit determines the associated data transfer value and transmits that associated value to the multiply accumulator unit 22.

Multiply accumulator unit 22 receives the input values transmitted to it from primary memory unit 14 and from weight memory unit 20, and multiplies each neuron input value by its associated data transfer value. More specifically, each neuron input value and its associated data transfer value are transmitted to both the excitory and the inhibitory multiply accumulator members 56 and 60. If the product of a neuron input value and the associated data transfer value is positive, then steering logic in unit 22, using polarity flags from the weight memory 20 and memory 14, generates an activating signal for the excitory multiply accumulator; while if the product of a neuron input value and the associated data transfer value is negative, then the steering logic in unit 22 generates an activating signal for the inhibitory multiply accumulator. When a multiply accumulator member receives an activating signal, the accumulator multiplies the most recent neuron input value it has received, by the most recent data transfer value it has received, to derive a product referred to as an output component value. As a neuron output value is being calculated, each multiply accumulator member 56 and 60 maintains a cumulative total of all of the output component values calculated by that accumulator member.

More specifically, a memory area 56a is in or is associated with the excitory multiply accumulator member, and a memory area 60a is in or is associated with inhibitory multiply accumulator member 60. When processing section $P_1$ begins to calculate a neuron output value, each of these memory areas is set to a zero value; and each time one of the multiply accumulator members calculates an output component value, that value is added to the current value in the memory area associated with that multiply accumulator member.

Hence, as the output of a particular neuron is being calculated, excitory multiply accumulator member 56 maintains a cumulative total of all of the positive output component values for that neuron, and inhibitory multiply accumulator member 60 maintains a cumulative total of all of the negative output component values for the neuron. After all of the output component values for a neuron have been calculated, job table 50 transfers the values in accumulator memories 56a and 60a into fifo registers 56b and 60b respectively, and invokes arithmetic processor 24 to determine the output value for that neuron by subtracting the then current value in the register 60b from the then current value in the register 56b. The arithmetic processor may then broadcast this neuron output value over the system data bus, along with the appropriate identifying global address over the system address bus.

Instead of broadcasting the neuron output values calculated in the above-described manner, arithmetic processor 24 may process one or more of these neuron output values, and then broadcast the processed neuron output values. In general, the arithmetic processor may be programmed to apply any transfer value to the raw neuron output values.

Figure 7:
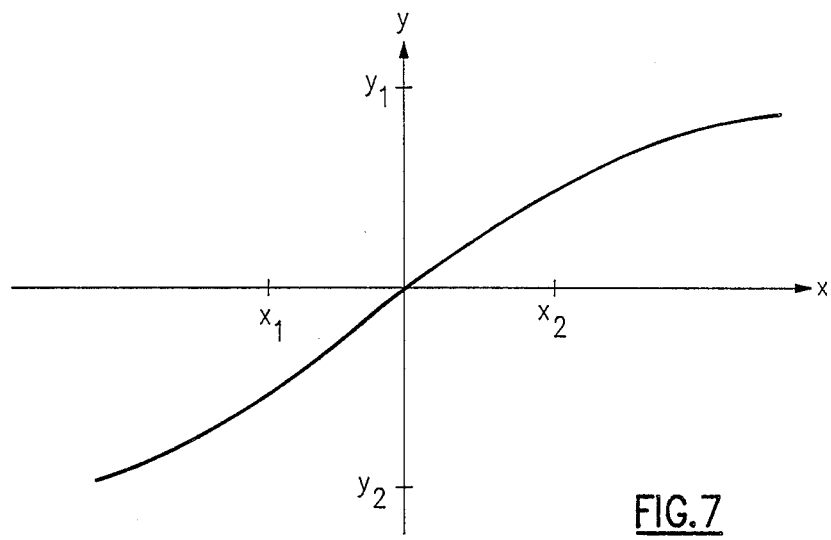
FIG. 7 illustrates a sigmoid transfer function that may be applied to the raw neuron output values calculated with the processing system.

To elaborate, with the procedure described immediately above, the raw output value of each neuron is the sum of the weighted input values applied to the neuron. It is believed by many, though, that at least for many applications, a neuromorphic system may better simulate the human thinking process if that raw neuron output value is processed by a sigmoid function of the type shown in FIG. 7, to provide a processed neuron output value. In FIG. 7, the processed output of a neuron is represented by the Y-axis, while the sum of the weighted inputs of the neuron is represented by the X-axis. Within a limited range, represented by the portion of the X-axis between about $X_1$ and $X_2$, the processed output of the neuron is equal to or linearly proportional to the sum of the weighted inputs. As the sum of the weighted inputs increases above $X_2$, the processed output value of the neuron also increases, but this increase is not linearly related to the increase in the sum of the weighted inputs, and the output of the neuron increases toward but never exceeds a maximum value $Y_1$ Analogously, as the sum of the weighted inputs decreases below $X_1$, the processed output value of the neuron also decreases, but this decrease is not linearly related to the decrease in the sum of the weighted inputs, and the output of the neuron decreases toward but never falls below a minimum value $Y_2$.

Figure 8:
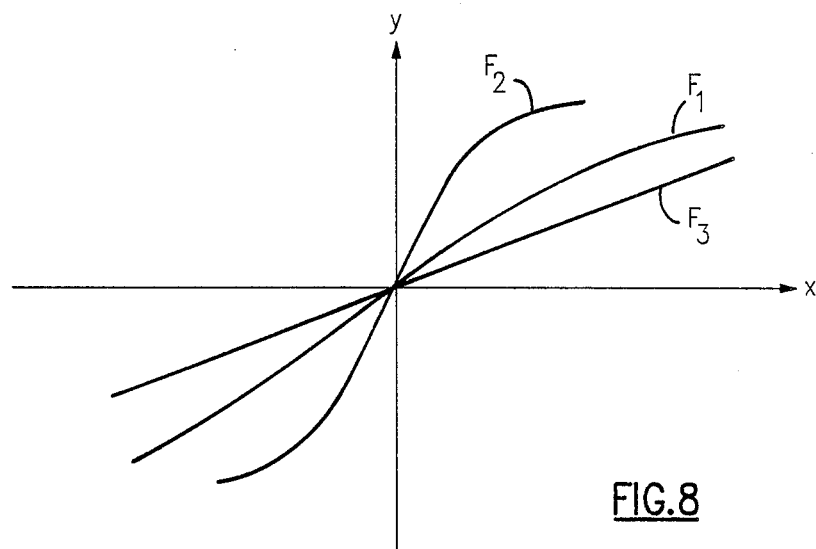
FIG. 8 shows several sigmoid transfer functions that may be applied to various data values used in the processing system.

Arithmetic processor 24 may be programmed to apply one of a selected group of sigmoid transfer functions to one, several or all of the raw neuron output values calculated from the data transmitted to the arithmetic processor from the multiply accumulator unit 22. For example, with reference to FIG. 8, the arithmetic processor may be designed to apply sigmoid transfer function $F_1$ to the raw output of neuron N1, to apply sigmoid transfer function $F_2$ to the raw outputs of neuron N2 and N4, to apply transfer function $F_3$ to the raw output of neurons $N_5$, and not to apply any sigmoid transfer function to the outputs of neuron $N_3$ or $N_6$.

Post synaptic transfer unit 44 is provided to apply one or more of a selected group of transfer functions, if desired, to one, several or all of the neuron input values transmitted from memory unit 14 to multiply accumulator 22 to limit or adjust those neuron input values without halting the processing section or requiring the action of processor 24. For instance, again with reference to FIG. 8, unit 44 may be designed to apply transfer function $F_1$ to a first group of neuron input value, to apply transfer function $F_2$ to a second group of neuron input values, to apply transfer function $F_3$ to a third group of neuron input values and not to apply any transfer function to the rest of the neuron input values. Switch 62 may be provided to control whether the output values from memory unit 14 are transmitted to the post synaptic transfer unit 44. In a first position of switch 62, shown in FIG. 3, the switch engages contact 62a so that values transmitted from memory unit 14 are directed through the post synaptic transfer unit; and in a second position, switch 62 engages contact 62b to conduct values from memory unit 14 directly to multiply accumulator unit 22, by-passing the post synaptic transfer unit.

Change weight logic device 42 is connected to memory 14, weight memory unit 20 and arithmetic processor 24 to monitor the neuron input values, the data transfer values and the neuron output values, and to determine whether any of the data transfer values should be changed; and preferably, logic device 42 monitors these data transfer values as they are transmitted from the weight memory unit to multiply accumulator unit 22. Any suitable logic may be used to determine which, if any, of the data transfer values should be changed. For example, with some procedures, the data transfer value that is applied to a particular neuron input may be adjusted depending upon the output of that neuron. With other procedures, any data transfer value may be adjusted if the corresponding neuron input value exceeds a certain threshold value, which may change over time. A combination of both of these can also be used, as well as schemes that depend on the rate of change of the neuron input and output values. Numerous logic programs are well-known in the art to select which, if any, of the data transfer values that should be changed and any suitable program may be employed in the practice of the present invention.

These changes may be scheduled according to values stored in job table 50, or a change may be required at unpredictable times as determined during operation of section $P_1$. Change weight logic device 42 is preferably designed to monitor certain values and to alert processor 24 when certain events occur. For example, device 42 can test for the following conditions or any combination thereof: (i) a neuron output value greater than some variable threshold, (ii) a neuron input value greater than some variable threshold, or (iii) the change in a neuron output or input value being positive, negative, or greater than some variable positive or negative magnitude. Typically, the above-mentioned variable threshold values that are applied during one processing period, are determined during the previous processing period.

Upon receiving the signal to do so, the arithmetic processor calculates a new data transfer value for a specified neuron input. The data transfer value may be calculated according to any suitable algorithm or algorithms, and the algorithm or algorithms used by arithmetic processor are preferably stored in processor memory unit 26 and invoked by the arithmetic processor as appropriate. In the event of a required change in one of the data transfer values, processing section $P_1$ may proceed uninterrupted, or the change weight logic device 42 may transmit a change weight signal to job table 50 to halt temporarily neuron output calculations and to allow the arithmetic processor to modify the data in memory 20.

Once a new data transfer value is calculated for a neuron input, the arithmetic processor transmits that new value to the weight memory unit, along with the proper address at which the new value is to be stored therein. An automatic data transfer value addressing mechanism may be provided to allow processor 24 to read the present data transfer value in memory 20 and to modify that value without having to calculate, or have knowledge of, its storage location in memory unit 20.

Figure 3:
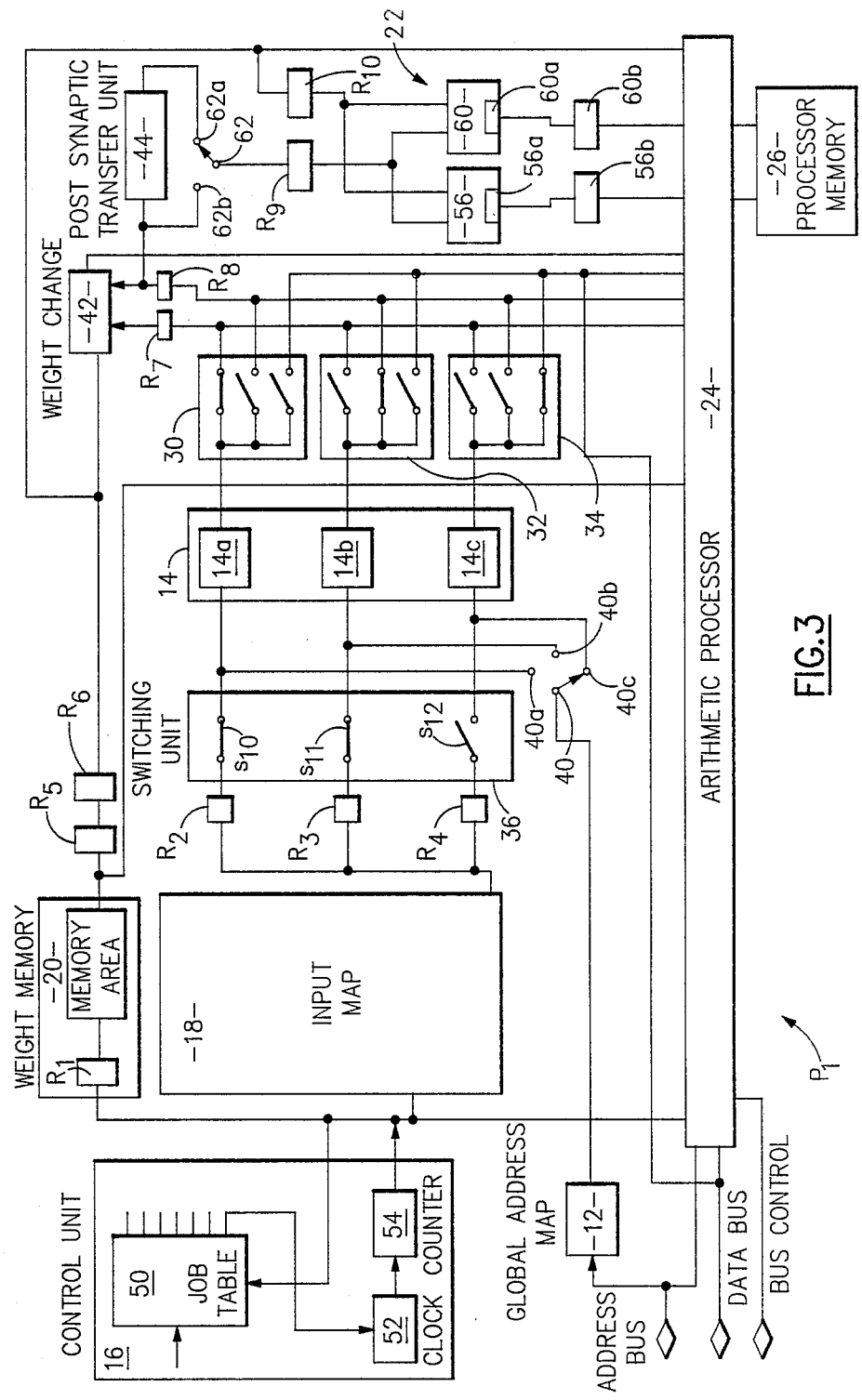
FIG. 3 is a block diagram of one processing section of the data processing system of FIG. 2.

Also, with the architecture of processing section $P_1$ shown in FIG. 3, a newly calculated data transfer value may also be transmitted by the arithmetic processor directly to multiply accumulator unit 22 for use in the currently occurring neuron output calculation. If this is done, it may be preferred to suspend operation of the multiply accumulator unit and to suspend the transmission of data thereto, to provide the arithmetic processor with time to calculate the new data transfer value. This suspension can be achieved by temporarily disabling clock 52, and this can be done by invoking job table 50 to transmit a disable signal to the clock. After the processor 24 calculates the new data transfer value, the processor sends a signal to the job table; and, in response, the job table can transmit an enable signal to the clock to restart the clock and resume operation of the multiply accumulator unit and the transmission of data thereto.

Pipeline registers $R_1$–$R_{10}$ are provided to help synchronize the flow of data through the processing section $P_1$; and in particular, to insure that the data transfer value for each neuron input arrives at the multiply accumulator unit with the data value for that neuron input.

System S operates in a unique multi period cycle. In each period, each processing section of the system calculates an output value for each neuron associated with that processing section. During each processing period, one of the memory areas of the memory unit 14 is used to supply to the multiply accumulator unit 22 all of the neuron input values needed in that period to calculate the neuron outputs, and another of the memory areas of the memory unit is used to store all of the values received during that period that are to be used to calculate neuron output values in the next processing period. During each processing period, the memory area that is used in the former manner is referred to as the present state memory, the memory area that is used in the latter manner is referred to as the future state memory, and the memory area that is neither the present nor the future state memory is referred to as the past state memory.

Moreover, the functions of the memory areas are changed in a regular, cyclical manner from period to period. More specifically, the future state memory during one processing period becomes the present state memory during the next processing period, the present state memory during one processing period becomes the past state memory during the next processing period, and the past state memory during one processing period becomes the future state memory during the next processing period. Preferably, three processing periods comprise one complete cycle, which is continuously repeated, so that during each such cycle, each state memory functions once as the future state memory, once as the present state memory, and once as the past state memory.

Figure 9:
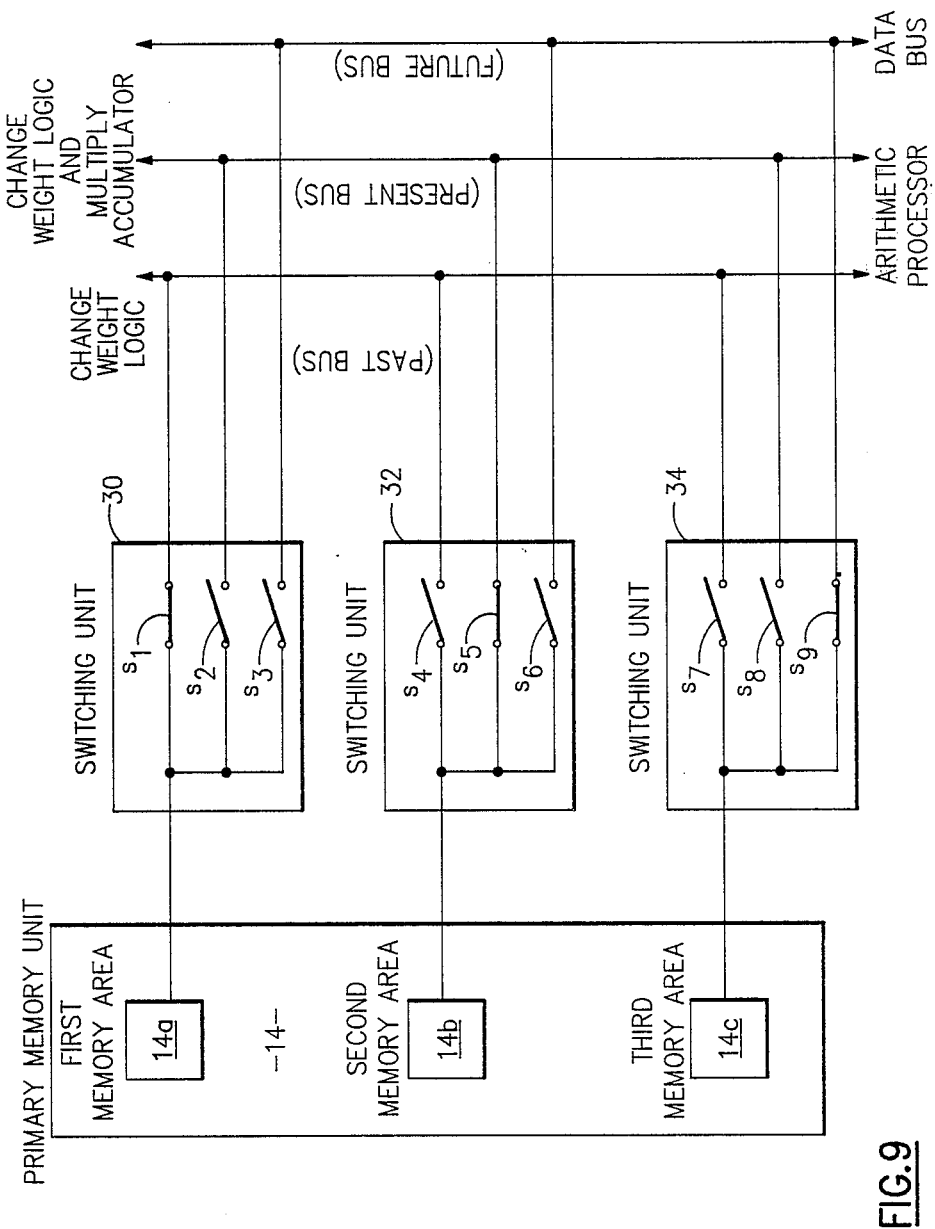
FIG. 9 is an enlarged view of a portion of FIG. 3, and in particular, shows three switching units of the processing section.

Switching units 30, 32, 34 and 36 and address switch 40 are used to route data to and from the proper memory areas. With reference to FIGS. 3 and 9, each of switching units 30, 32, 34 and 36 includes three switches; and in particular, unit 30 includes switches $s_1$, $s_2$, and $s_3$, unit 32 includes switches $s_4$, $s_5$ and $s_6$, unit 34 includes switches $s_7$, $s_8$ and $s_9$, and unit 36 includes $s_{10}$, $s_{11}$ and $s_{12}$.

Switches $s_3$, $s_6$ and $s_9$ are used to conduct data selectively from the system data bus to memory areas 14a, b and c respectively. More specifically, each of switches $s_3$, $s_6$ and $s_9$ is normally open; and switch $s_3$ is closed to conduct data from the system data bus to memory area 14a, switch $s_6$ is closed to conduct data from the system data bus to memory area 14b, and switch $s_9$ is closed to conduct data from the system data bus to memory area 14c. During each processing period, one and only one of the switches $s_3$, $s_6$ and $s_9$ is closed, and the one switch that is closed determines which of the memory areas is the future state memory area during that processing period. Switches $s_3$, $s_6$ and $s_9$ may also be used to update memory areas 14a, b and c simultaneously from an external data source. This can be done by suspending operation of multiply accumulator unit 22, closing all three switches $s_3$, $s_6$ and $s_9$, and broadcasting the contents of the system data bus to all three memory areas 14a, b and c. Once the desired data has been transmitted into those memory areas, two of the three switches $S_3$, $S_6$, and $s_9$ may be opened, and operation of the multiply accumulator unit may be resumed.

Switches $s_2$, $s_5$ and $s_8$ are used to conduct data selectively to multiply accumulator unit 22 from memory areas 14a, b and c, respectively. In particular, each of switches $s_2$, $s_5$ and $s_8$ is normally open; and switch $s_2$ is closed to conduct data from memory area 14a to the multiply accumulator unit, switch $s_5$ is closed to conduct data from memory area 14b to the multiply accumulator unit, and switch $s_8$ is closed to conduct data from memory area 14c to the multiply accumulator unit. During each processing period, one and only one of switches $s_2$, $s_5$ and $s_8$ is closed, and the one switch that is closed determines which of the memory areas is the present state memory during that processing period.

Switches $s_1$, $s_4$ and $s_7$ are provided to conduct data, during each processing period, to change weight logic device 42 and to arithmetic processor 24 from the memory area that is the past state memory during that processing period. To elaborate, some programs for determining whether a data transfer value should be changed, and some algorithms for calculating new data transfer values, may required values from both the present and the past state memories. For this reason, it is preferred that the change weight logic device and the arithmetic processor be connected to both the present and the past state memories during each processing period. Switches $s_1$, $s_4$ and $s_7$ are normally open. When memory area 14a is the past state memory, switch $s_1$ is closed and switches $s_4$ and $s_7$ are open; when memory area 14b is the past state memory, switch $s_4$ is closed and switches $s_1$ and $s_7$ are open; and when memory area 14c is the past state memory, switch $s_7$ is closed and switches $s_1$ and $s_4$ are open.

Switches $s_{10}$, $s_{11}$ and $s_{12}$ are used to transmit the address data from input map 18 to whichever memory area is the present memory area, and preferably also to whichever memory area is the past memory area. In response to receiving a particular address value, the present state memory transmits the value it hold at that address to the multiply accumulator unit, and the past state memory transmits the value it holds at that address to the change weight logic device. Switch $s_{10}$ is closed when memory area 14a is either the present or the past state memory, and this switch is open when that memory area is the future state memory. Switch $s_{11}$ is closed when memory area 14b is either the present or the past state memory, and this switch is open when that memory area is the future state memory. Switch $s_{12}$ is closed when memory area 14c is either the present or the past state memory, and this switch is open when that memory area is the future state memory.

Address switch 40 is used to route to the memory area that is the future state memory, the address data transmitted from global address map 12. This switch 40 is a three position switch. When memory area 14a is the future state memory, the switch engages contact 40a so that the address data is transmitted from the global address map to that memory area. When memory area 14b is the future state memory, the address switch engages contact 40b so that the address data is transmitted from the global address map to that memory area. When memory area 14c is the future state memory, switch 40 engages contact 40c so that the address data is transmitted from the global address map to that memory area.

The specific position or states of switches $s_1$–$s_{12}$ and switch 40 are controlled by the job table. Prior to the start of a particular processing period, the job table transmits signals to switching units 30, 32, 34, 36 and 40 to set the switches of these units in the proper positions or states for that processing period.

Figure 10:
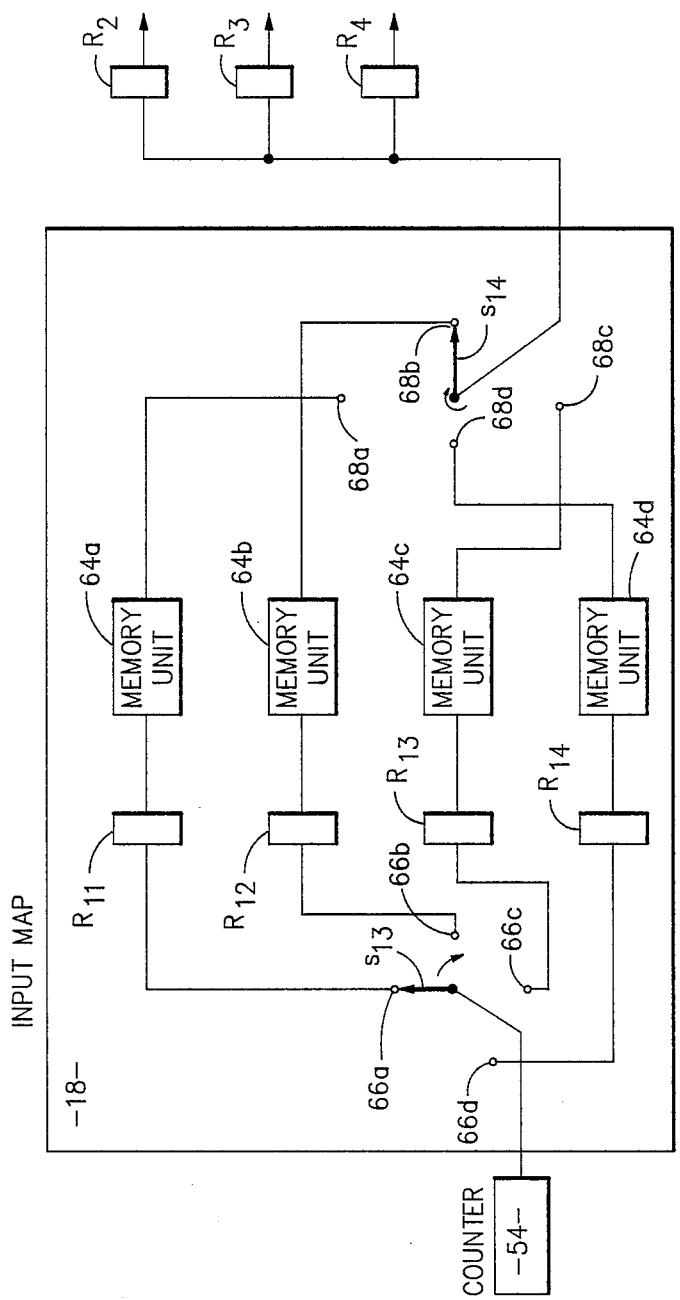
FIG. 10 shows a preferred input map of the processing section of FIG. 3.

With reference to FIG. 10, to improve the response time of input map 18, preferably, this input map comprises four memory units 64a, b, c and d, an input switch $s_{13}$ and an output switch $s_{14}$. The operation count values from counter 54 are directed to successive memory units 64a, b, c and d via the input switch $s_{13}$. In particular, at each operation count, switch $s_{13}$ engages a respective one of the contacts 66a, b, c and d; and over successive operation counts, switch $s_{13}$ engages contacts 66a, b, c and d in succession. Thus, for example, at one operation count, switch $s_{13}$ engages contact 66a and transmits the operation count to memory unit 64a via that contact; and at the next operation count switch $s_{13}$ engages contact 66b and transmits the operation count to memory unit 64b via that contact. At the next operation count, switch $s_{13}$ engages contact 66c and transmits that operation count to memory unit 64c; and at the next operation count, switch $s_{13}$ engages contact 66d and transmit the operation count to memory unit 64d. The above described cycle is continuously repeated every four operation counts so that, for instance, the next four operation counts are transmitted respectively to memory unit 64a, b, c and d.

Each memory unit 64a, b, c and d includes a table similar to or identical to the one shown in FIG. 5 to identify the address in each memory unit 14a, b and c of the neuron input value associated with each operation count. After receiving an operation count, each memory unit 64a, b, c and d will determine the address in each memory unit 14a, b and c of the associated neuron input value, and then transmit that address value toward output switch $S_{14}$. Output switch $s_{14}$, operating in a manner similar to input switch $s_{13}$, directs the address values to memory unit 14 from successive memory units 64a, b, c and d. Specifically, at each operation count, switch $s_{14}$ engages a respective one of the contacts 66a, b, c and d; and over successive operation counts, switch $s_{14}$ engages contacts 68a, b, c and d in succession. Specifically, at one operation count, switch $s_{14}$ engages contact 68a and transmits to memory unit 14 the address value transmitted from memory unit 64a; and at the next operation count, switch $s_{14}$ engages contact 68b and transmits to the memory unit 14 the operation count transmitted to the switch from memory unit 64b. At the next operation count, switch $s_{14}$ engages contact 68c and transmits to memory unit 14 the address value transmitted to switch $s_{14}$ from memory unit 64c; and at the next operation count, switch $s_{14}$ engages contact 68d and transmits to memory unit 14 the address value transmitted to switch $s_{14}$ from memory unit 64d. This cycle is continuously repeated every four operation counts so that, for example, the next four address values are transmitted to memory unit 14 from memory units 64a, b, c and d respectively.

Switches $s_{13}$ and $s_{14}$ are preferably controlled so that when switch $s_{13}$ is transmitting an operation count to one of the memory units 64a, b, c and d, switch $s_{14}$ is transmitting the address value determined by the memory unit that will receive the next operation count from switch $s_{13}$ Hence, for example, when switch $s_{13}$ transmits an operation count to memory unit 64a, switch $s_{14}$ engages contact 68b to receive an address from memory unit 64b; and when switch $s_{13}$ engages contact 66b to transmit an operation count to memory unit 64b, switch $s_{14}$ engages contact 68c to receive an address value from member unit 64c. Similarly, when switch $s_{13}$ engages contact 66c to transmit an operation count to memory unit 64c, switch $s_{14}$ engages contact 68d to receive an address value from memory unit 64d; and when switch $s_{13}$ engages contact 66d to transmit an operation count to memory unit 64d, switch $s_{14}$ engages contact 68a to receive an address value from memory unit 64a. Pipeline registers $R_{11}$-$R_{14}$ are provided to help synchronize the data flow through input map 18 and the whole processing section $P_1$.

Analogous to input map 18, weight memory 20 may also comprise a multitude of individual memory units (not shown), each of which holds data transfer values for all of the neuron inputs; and the weight memory 20 may be provided with input and output switches, similar to switches $s_{13}$ and $s_{14}$ respectively, to direct each operation count to one of the memory units of the weight memory, and to transmit data transfer values from the individual memory units of the weight memory to the multiply accumulator member 22.

One specific example of the operation of processing section $P_1$ will now be described in detail. As previously mentioned, this processing section is used to calculate outputs for the six neurons $N_1$-$N_6$, and seven values, $V_1$-$V_7$ are needed to do this. Typically, these values would have been stored in one of the memory areas of memory unit 14 during the previous processing period; and for the very first processing period of section $P_1$, arithmetic processor 24 may be used to transmit values $V_1$-$V_7$ to a selected one of the memory areas. For purposes of this example, assume that, for a first processing period, memory areas 14a, b and c are the past, present and future states respectively; and thus, with reference to FIG. 4, values $V_1$-$V_7$ are stored in locations $A_1$-$A_7$ respectively of memory area 14b.

At the start of the first processing period, switches $s_1$-$s_9$ are in the positions shown in FIG. 9, and switches $s_{10}$-$s_{12}$ and the global address switch 40 are in the positions shown in FIG. 3. In particular, switches $s_1$, $s_5$ and $s_9$ are closed, and switches $s_2$-$s_4$ and $s_6$-$s_8$ are open. Switches $s_{10}$ and $s_{11}$ are closed and switch $s_{12}$ is open, and the global address switch 40 engages contact 40c.

Also, the needed data transfer values are stored in weight memory unit 20. In particular, the data transfer values for neuron inputs $N1_1$-$N1_4$ are stored respectively at locations 1 through 4 of the weight memory unit, the data transfer values for neuron inputs $N2_1$-$N2_3$ are stored at locations 6 through 8 respectively of the weight memory unit, and the data transfer values for neuron inputs $N3_1$-$N3_3$ are stored at locations 10-12 respectively of the weight memory unit. The data transfer values for neuron inputs $N4_1$-$N4_3$ are stored at locations 14 through 16 respectively of the weight memory unit, the data transfer values for neuron inputs $N5_1$-$N5_4$ are stored at locations 18 through 21 respectively of the weight memory unit, and the data transfer values for neuron inputs $N6_1$-$N6_3$ are stored at locations 23 to 25 respectively of the weight memory unit. For the sake of this example, data transfer values $W_3$, $W_8$, $W_{12}$ and $W_{16}$ will be considered to be negative, and all of the other data transfer values will be considered to be positive.

To start a series of neuron output calculations, job table 50 transmits an enable signal to clock 52, and thereafter the clock transmits pulses at regular intervals to counter 54; and the counter keeps track of the number of such pulses, with this number being the operation count. Each time the operation count is incremented by 1, the new operation count is transmitted to the input map, the weight memory unit and the job table.

In response to the first operation count, the input map determines the address in memory area 14b of the value for neuron input $N1_1$, that address is transmitted to the memory area 14b; and in response to this, the value at that memory address is transmitted to the multiply accumulator unit. Also, in response to the first operation count, the weight memory unit determines the data transfer value associated with neuron input $N1_1$, and then transmits that value to the multiply accumulator unit. In response to receiving these two values, excitory multiply accumulator member 56 multiplies the two values and then places the product in its associated memory area 56a.

In a similar manner, in response to the second operation count, the input value for neuron input $N1_2$ and the data transfer value associated therewith are transmitted to the multiply accumulator unit from memory area 14b and weight memory unit 20 respectively. In response to receiving these two values, the excitory multiply accumulator member multiplies the two values and then adds the product to the value in its associated memory area.

In response to the third operation count, the input value for neuron input $N1_3$ and the data transfer value associated therewith are transmitted to the multiply accumulator unit from memory area 14b and weight memory unit 20 respectively. In response to receiving these two values, inhibitory multiply accumulator member 60 multiples the two values and then places the product in its associated memory area 60a.

The fourth operation count causes memory area 14b to transmit input value $V_4$ for neuron input $N1_4$ to the multiply accumulator unit, and causes weight memory unit 20 to transmit data transfer value $W_4$ to the multiply accumulator unit. After receiving these two values, the excitory multiply accumulator member multiplies the two values, and then adds the product to the value in its associated memory area.

Thus, in response to the first four operation counts, all of the input values of the first neuron $N_1$ and their associated data transfer values, have been transmitted to the multiply accumulator unit, and all of the output component values of the first neuron have been calculated. The accumulated sum in the memory area 56a is $V_1W_1 + V_2W_2 + V_4W_4$, and the value in memory area 60a is $V_3W_3$.

In response to the fifth operation count, the job table transmits a transfer signal that moves and stores the contents of memories 56a and 60a into memories 56b and 60b respectively, and resets memories 56a and 60a to zero values. Memories 56b and 60b then send a signal to the arithmetic processor indicating that these memories are not empty. This signal is removed when the arithmetic processor reads both memories 56b and 60b. In response to this signal, the arithmetic processor subtracts the value in memory area 60b from the value in memory area 56b, and this difference may be considered as the output value of neuron N1, or alternatively, as discussed above, this difference may be processed by the arithmetic processor to determine the neuron output value. Once the output value for neuron $N_1$ is determined, the arithmetic processor broadcasts that output value to all of the processing sections of system S over the system data bus, and broadcasts the accompanying global address for that neuron output over the address bus. For example, as this output value is broadcast over the system data bus, it is mapped by the global address map into the proper location in memory area 14c, which in this processing period, is the future state memory.

The sixth, seventh, eighth and ninth control pulses are used to calculate the output value for neuron N2. In particular, in response to the sixth operation count, the input value for neuron input $N2_1$ and the data transfer value associated therewith are transmitted to the multiply accumulator unit from memory area 14b and weight memory 20 respectively. In response to receiving these two values, the excitory multiply accumulator member multiplies the two values and then places the product and its associated memory area 56a.

The seventh operation count causes memory area 14b to transmit value $V_2$ for neuron input $N2_2$ to the multiply accumulator unit, and causes the weight memory unit to transmit data transfer value $W_6$ to the multiply accumulator unit. After receiving these two values, the excitory multiply accumulator member multiplies the two values and then adds the product to the value in its associated memory area.

In a similar manner, in response to the eighth operation count, the input value for neuron input $N_2$ and the data transfer value associated therewith are transmitted to the multiply accumulator unit from memory area 14b and weight memory unit 20 respectively. In response to receiving these two values, the excitory multiply accumulator member multiplies the two values and then adds the product to the value in its associated memory area.

In response to the ninth operation count, the job table transmits a transfer signal that moves and stores the contents of memories 56a and 60a into memories 56b and 60b respectively, and resets memories 56a and 60a to zero values. Memories 56b and 60b then send a signal to the arithmetic processor; and in response, the arithmetic processor subtracts the value, which is zero, in memory area 60b from the value in memory area 56b. Once the output value for neuron $N_2$ is calculated, the arithmetic processor broadcasts that output value to all of the processing sections of system S, along with the accompanying global address over the address bus. As this output is broadcast over the system data bus, it is mapped by the global address map into the proper location in memory area 14c.

The next four control pulses are used to calculate the output value for neuron $N_3$. In response to the tenth control pulse, the value for neuron input $N3_1$ is transmitted to the multiply accumulator unit from memory area 14b, and the data transfer value for neuron input $N3_1$ is transmitted to the multiply accumulator unit from the weight memory unit 20. In response to receiving these two values, the inhibitory multiply accumulator member multiplies the two values and places the product in its associated memory area 60a.

In response to the eleventh operation count, the input value for neuron input $N3_2$ and the data transfer value associated therewith are transmitted to the multiply accumulator unit from memory area 14b and weight memory 20 respectively. In response to receiving these two values, the excitory multiply accumulator member multiplies the two values and then places the product in its associated memory area 56a.

The twelfth operation count causes memory area 14b to transmit value $V_3$ for neuron input $N3_3$ to the multiply accumulator unit, and causes weight memory unit 20 to transmit data transfer value $W_{10}$ to the multiply accumulator unit. After receiving these two values, the excitory multiply accumulator member multiplies the two values and then adds the product to the value in its associated memory area.

In response to the thirteenth operation count, the job table transmits a transfer signal that transfers the contents of memories 56a and 60a into memories 56b and 60b respectively, and resets memories 56a and 60a to zero values. Memories 56b and 60b then send a signal to the arithmetic processor; and in response, the arithmetic processor subtracts the value in memory area 60b from the value in memory area 56b. Once the output value for neuron N3 is determined, the arithmetic processor broadcasts that output value to all of the processing section of system S over the system data bus, along with the accompanying global address over the address bus. As this output value is broadcast over the system data bus, it is mapped by the global address map into the proper location in memory area 14c for use in the next processing period.

The fourteenth through seventeenth operation counts are used to calculate the output value for neuron N4. Specifically, in response to the fourteenth operation count, the input map determines the address in memory area 14b of the value for neuron $N4_1$, that address is transmitted to the memory area 14b; and in response to this, the value at that memory address is transmitted to the multiply accumulator unit. Also, in response to the 14th operation count, the weight memory unit determines the data transfer value associated with neuron input $N4_1$, and then transmits that value to the multiply accumulator unit. In response to receiving these two values, the excitory multiply accumulator member multiplies the two values and places the product in its associated memory area 56a.

In a similar manner, in response to the fifteenth operation count, the input value for neuron input $N4_2$ and the data transfer value associated therewith are transmitted to the multiply accumulator unit from memory area 14b and weight memory unit 20 respectively. In response to receiving these two values, the inhibitory multiply accumulator member multiplies the two values and then places the product in its associated memory area 60a.

The sixteenth operation count causes memory area 14b to transmit value $V_6$ for neuron input $N4_3$ to the multiply accumulator unit, and causes weight memory unit 20 to transmit data transfer value $W_{13}$ to the multiply accumulator unit. After receiving these two values, the excitory multiply accumulator member multiplies the two values and then adds the product to the value in its associated memory area.

Thus, in response to the fourteenth, fifteenth and sixteenth operation counts, all of the input values for neuron N4, and their associated transfer values, have been transmitted to the multiply accumulator unit, and all of the output component values for neuron N4 have been calculated. The accumulated sum in the memory area 56a is $V_4W_{11} + V_6W_{13}$, and the value in memory area 60a is $V_5W_{12}$.

The seventeenth operation count causes the job table to transmit a transfer signal that moves and stores the contents of memories 56a and 60a into memories 56b and 60b respectively, and resets memories 56a and 60a to zero values. Memories 56b and 60b then send a signal to the arithmetic processor; and in response, the arithmetic processor subtracts the value in memory area 60b from the value in memory area 56b. This difference may be considered as, or may be used to determine, the output value of neuron N4; and once that output value is determined, the arithmetic processor broadcasts the neuron output value to all of the processing sections of system S over the system data bus along with the accompanying global address over the address bus. As this output value is broadcast over the system data bus, it is mapped by the global address map into the proper location in memory area 14c.

The next five operation counts are used to calculate the output value for neuron N5. In response to the eighteenth operation count, memory area 14b transmits value $V_7$ for neuron input $N5_1$ to the multiply accumulator unit. Also, in response to this operation count, weight memory unit 20 transmits weight value $W_{14}$ to the multiply accumulator unit. In response to receiving these two values, the excitory multiply accumulator member multiplies the two values and places the product in its associated memory area 56a.

Likewise, in response to the nineteenth operation count, the input value for neuron input $N5_2$ and the data transfer value associated therewith are transmitted to the multiply accumulator unit from memory area 14b and weight memory unit 20 respectively. In response to receiving these two values, the excitory multiply accumulator member multiplies the two values and then adds the product to the value in its associated memory area.

In response to the twentieth operation count, the input value for neuron input $N5_3$ and the data transfer value associated therewith are transmitted to the multiply accumulator unit from the memory area 14b and the weight memory unit 20 respectively. After receiving these two values, the inhibitory multiply accumulator multiplies the two values and then places the product in its associated memory area 60a.

The twenty-first operation count causes memory area 14b to transmit input value $V_6$ for neuron input $N5_4$ to the multiply accumulator unit, and causes weight memory unit 20 to transfer data transfer value $W_{17}$ to the multiply accumulator unit. After receiving these two values, the excitory multiply accumulator multiplies the two values and then adds the product to the value in its associated memory area.

In response to the twenty-second operation count, the job table transmits a transfer signal that transfers the contents of memories 56a and 60a into memories 56b and 60b respectively, and resets memories 56a and 60a to zero values. Memories 56b and 60b then send a signal to the arithmetic processor; and in response, the arithmetic processor subtracts the value in memory area 60b from the value in memory area 56b. This difference may be considered as, or may be used to calculate, the output value of neuron N5; and once that neuron output value has been calculated, the arithmetic processor broadcasts the neuron output value to all of the processing sections of system S over the system data bus, along with the accompanying global address over the address bus.

The twenty-third, twenty-fourth, twenty-fifth and twenty-sixth operation counts are used to calculate the output value for neuron N6. In response to the twenty-third, twenty-fourth and twenty-fifth operation count, values $V_4$, $V_5$ and $V_6$ for neuron inputs $N6_1$, $N6_2$ and $N6_3$ respectively are transmitted to the multiply accumulator unit from memory area 14b. Similarly, in response to the twenty-third, twenty-fourth and twenty-fifth operation counts, weight memory unit 20 transmits data transfer values $W_{18}$, $W_{19}$ and $W_{20}$ respectively to the multiply accumulator unit. In response to receiving values $V_4$ and $W_{18}$, the excitory multiply accumulator member multiplies the two values and then places the product in its associated memory area 56a. When the excitory multiply accumulator member receives values $V_5$ and $W_{19}$, this accumulator member multiplies these two values and adds the product to the value in its associated memory area. Similarly, when the excitory multiply accumulator member receives values $V_6$ and $W_{20}$, this accumulator member multiplies the two values and adds the product to the value in its associated memory area.

In response to the twenty-sixth operation count, the job table transmits a transfer signal that moves and stores the contents of memories 56a and 60a into memories 56b and 60b respectively, and resets memories 56a and 60a to zero values. Memories 56b and 60b then send a signal to the arithmetic processor; and in response, the arithmetic processor subtracts the value, which is zero, in memory area 60b from the value in memory area 56b. Once the output value for neuron N6 is determined, the arithmetic processor broadcasts that output value to all of the processing sections of system S over the system data bus, along with the accompanying global address over the address bus.

Processing section $P_1$ has now calculated a complete set of output values for neurons N1 through N6, the first period of the processing cycle is now complete, and the processing section is ready to begin the second period of the processing cycle.

The values $V_1$-$V_7$ needed to calculate the neuron output values during the second processing period, were all transmitted to memory unit 14, specifically memory area 14c, of processing section $P_1$ during the first processing period, either from the system input-output means, from the other processing sections of system $S_1$ or from the arithmetic processor 24 of processing section $P_1$ itself. Thus, at the start of the second processing period, all of the needed neuron input values are stored in memory area 14c, at addresses assigned to these values according to the table of FIG. 5.

To begin the second processing period, switch $s_9$ is opened and switch $s_3$ is closed, making memory area 14a the future state; and switch $s_5$ is open and switch $s_8$ is closed, making memory area 14c the present state. Switch $s_1$ is opened and switch $s_4$ is closed to insure that the change weight logic device receives data from memory area 14b, which is now the past state memory. Switch $s_{10}$ is opened and switch $s_{12}$ is closed so that the address data generated by the input map is transmitted to memory areas 14b and c, which are used, in this period, as the past and present memory states respectively. Further, the global address switch is connected with terminal 40a, so that the address data from the global address map is transmitted to the memory area 14a which is used as the future state memory in this period.

Thus, at the start of this second processing period, neuron input values $V_1$-$V_7$ are in the memory area 14c that is now the present state memory. The neuron output values are calculated in this second period in the same general manner as described above, except that the neuron input values are take from state memory 14c. During this second period, neuron output values N1°, N2°, N3° and N4°, which are to be used in the next processing period, are transmitted to state memory 14a, which is the future state memory during this second period. These neuron output values are located in that state memory 14a according to the table of FIG. 5.

After the second series of neuron output values are calculated and broadcast to the processing sections of system 10, the second processing period is complete, and the processing section is ready to begin the third period of the processing cycle.

The values $V_1$-$V_7$ needed to calculate the neuron output values during the third processing period were all transmitted to memory unit 14, specifically memory area 14a, of processing section $P_1$ during the second processing period, either from the system input-output means, from the other processing sections of system $s_1$ or from the arithmetic processor of processing section $P_1$ itself. At the start of the third processing period, all of the needed neuron input values are stored in memory area 14a, at the addresses assigned to these values according to the table of FIG. 5.

To begin this third period, switch $s_3$ is opened and switch $s_6$ is closed, making memory area 14b the future state; and switch $s_8$ is opened and switch $s_2$ is closed, making memory area 14a the present state. Switch $s_4$ is opened and switch $s_7$ is closed to insure that the change weight logic device receives data from memory area 14c, which is now the past state memory. Switch $s_{11}$ is opened and switch $s_{10}$ is closed, so that the address data generated by the input map is transmitted to the memory areas 14c and 14a, which are used, in this third period, as the past and present states respectively. Also, the global address switch is connected with terminal 40b, so that the address data from the global address map is transmitted to the memory area 14b that is used as the future state memory in this period.

Processing section $P_1$ then calculates a third series of output values for neurons N1 through N6; and these calculations are done in the same general manner as they were in the first and second processing periods, except that the neuron input values are taken from state memory 14a. During this third processing period, neuron output values N1°, N2°, N3° and N4°, which are to be used in the next processing period, are transmitted to state memory 14b, which is the future state memory during this third period. These neuron output values are located in that state memory 14b according to the table of FIG. 5. During this third processing period, all of the other values needed to calculate the neuron output values during the next processing period are also transmitted to memory area 14b, either from the system input-output means or from the other processing section of system $S_1$ and stored therein at the proper addresses according to FIG. 5.

After the third series of neuron output values are calculated and broadcast to all of the processing sections system S, the third processing period is complete. Three processing periods completes one processing cycle, and hence for the next processing period, section $P_1$ functions as it did in the first of the above-discussed periods— specifically, with state memory 14c as a future state memory, state memory 14b as the present state memory, and state memory 14a as the past state memory.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed:

1. An information processing method to calculate output values for a group of neurons, each of the neurons having a plurality of inputs, the method comprising:
   transmitting input values for the neurons to a memory unit of a processing section, the memory unit including at least first and second areas;
   calculating a plurality of series of neuron output values over plurality of cycles, each cycle including at least first and second periods, and including
   (i) during the first period of each cycle, calculating a first series of neuron output values from neuron input values stored in the first memory area, and
   (ii) during the second period of each cycle, calculating a second series of neuron output values from neuron input values stored in the second memory area; and
   the transmitting step including the steps of
   (i) storing in the first memory area of the memory unit neuron input values that are transmitted to the memory unit during the period immediately preceding the first period of each cycle and that are used during said first period to calculate said first series of neuron output values, and
   (ii) storing in the second memory area of the memory unit, neuron input values that are transmitted to the memory unit during the first period of each cycle and that are used during the second period of the cycle to calculate said second series of neuron output values.

2. A method according to claim 1, wherein:
   the memory unit of the processing section further includes a third area;
   each of said cycles includes a third period;
   the step of calculating the plurality of series of neuron output values further includes the step of (iii) during the third period of each cycle, calculating a third series of neuron output values from neuron input values stored in the third memory area;
   the transmitting step further includes the step of (iii) storing in the third memory area, neuron input values transmitted to the memory unit during the second period of each cycle and that are used during the third period of the cycle to calculate said third series of neuron output values.

3. A method according to claim 2, wherein:
   each cycle consists of three periods; and
   the period immediately preceding the first period of each cycle is the third period of the immediately preceding cycle.

4. A method according to claim 1 wherein:
   all of the neuron input values transmitted to the memory unit during the period immediately preceding the first period of each cycle, are stored in the first memory area; and
   all of the neuron input values transmitted to the memory unit during the first period of each cycle are stored in the second memory area.

5. A method according to claim 3, wherein:
   all of the neuron input values transmitted to the memory unit during the third period of each cycle are stored in the first memory area;
   all of the neuron input values transmitted to the memory unit during the first period of each cycle are stored in the second memory area; and
   all of the neuron input values transmitted to the memory unit during the second period of each cycle are stored in the third memory area.

6. A method according to claim 2, wherein the processing section further includes a multiply accumulator unit to calculate the neuron output values, a first data line to transmit neuron input values from the memory unit to the multiply accumulator unit, a second data line to transmit neuron input values to the memory unit, a first switching unit to control the transmission of neuron input values between the first memory area and the first and second data lines, a second switching unit to control the transmission of neuron input values between the second memory area and the first and second data lines, and a third switching unit to control the transmission of neuron input values between the third memory area and the first and second data lines, and wherein:
   the calculating step includes
   in the first period of each cycle, using the first switching unit to connect the first memory area to the first data line to transmit neuron input values from the first memory area to the multiply accumulator unit,
   in the second period of each cycle, using the second switching unit to connect the second memory area to the first data line to transmit neuron input values from the second memory area to the multiply accumulator unit, and
   in the third period of each cycle, using the third switching unit to connect the third memory area to the first data line to transmit neuron input values from the third memory area to the multiply accumulator unit; and
   the transmitting step includes the steps of
   in the first period of each cycle, using the second switching unit to connect the second memory area to the second data line to transmit neuron input values to the second memory area for use in the second period of the cycle,
   in the second period of each cycle, using the third switching unit to connect the third memory area to the second data lien to transmit neuron input values to the third memory area for use in the third period of the cycle, and
   in the third period of each cycle, using the first switching unit to connect the first memory area to the second data line to transmit neuron input values to the first memory area for use in the first period of the next cycle.

7. A method according to claim 1, wherein the processing section further includes multiply accumulator means to calculate the neuron output values, a first data line to transmit neuron input values from the memory unit to the multiply accumulator means, a second data line to transmit neuron input values to the memory unit, a first switching unit to control the transmission of neuron input values between the first memory area and the first and second data lines, and a second switching unit to control the transmission of neuron input values between the second memory area and the first and second data lines, and wherein:
   the calculating step includes
   in the first period of each cycle, using the first switching unit to connect the first memory area to the first data line to transmit neuron input values from the first memory area to the multiply accumulator means, and
   in the second period of each cycle, using the second switching unit to connect the second memory area to the second data line to transmit neuron input values from the second memory area to the multiply accumulator means; and the transmitting step includes the step of, in the first period of each cycle, using the second switching unit to connect the second memory area to the second data line to transmit neuron input values to the second memory area for use in the second period of the cycle.

8. An information processing system, comprising:
at least one processing section to calculate output values for a plurality of neurons, each of the neurons having a plurality of inputs;
input means to broadcast a plurality of neuron input values to the processing section;
the processing section including
(i) a memory unit including at least first and second memory areas to hold the neuron input values,
(ii) calculating means to calculate a plurality of series of neuron output values over a plurality of cycles, each cycle including at least first and second periods,
(iii) neuron input value transmission means to transmit neuron input values between the input means and the memory unit and between the memory unit and the calculating means, and adapted (a) to transmit neuron input values from the first memory area to the calculating means during the first period of each cycle to calculate a first series of neuron output values, and to transmit neuron input values from the second memory area to the calculating means during the second period of each cycle to calculate a second series of neuron output values, and (b) to transmit input values from the input means to the second area of the memory during the first period of each cycle, and to transmit input values to the first area of the memory unit during a period immediately preceding the first period of each cycle.

9. An information processing system according to claim 8, wherein:
the memory unit of the processing section includes a third area;
each of said cycles includes a third period; and
the transmission means is further adapted to transmit neuron input values from the third memory area to the calculating means during the third period of each cycle to calculate a third series of neuron output values, and to transmit neuron input values to the third area of the memory unit during the second period of each cycle.

10. An information processing system according to claim 8, wherein:
the neuron input value transmission means includes
(i) a first data line to transmit the neuron input values from the memory unit to the calculating means,
(ii) a second data line to transmit the neuron input values to the memory unit,
(iii) a first switching unit having a first state to connect the first memory area to the first data line to transmit neuron input values from the first memory area to the calculating means, and a second state connecting the first memory area to the second data line to transmit neuron input values to the second memory area, and
(iv) a second switching unit having a first state to connect the second memory area to the first data line to transmit neuron input values from the second memory area to the calculating means and a second state connecting the second memory area to the second data line to transmit neuron input values to the second memory area;
in the first period of each cycle, the first switching unit is in the first state thereof, and the second switching unit is in the second state thereof; and
in the second period of each cycle, the second switching unit is in the first state thereof.

11. A system according to claim 10, further including control means connected to the first and second switching units to control the states thereof.

12. A system according to claim 11, wherein the control means is adapted to place the first switching unit into the first state thereof and to place the second switching unit in the second state thereof at the beginning of the first period of each cycle; and to place the second switching unit in the first state thereof at the start of the second period of each cycle.

13. An information processing system according to claim 9, wherein:
the transmission means includes
(i) a first data line to transmit the neuron input value from the memory unit to the calculating means,
(ii) a second data line to transmit the neuron input values to the memory unit,
(iii) a first switching unit having first state connecting the first memory area to the first data line to transmit neuron input values from the first memory area to the calculating means, and a second state connecting the first memory area to the second data line to transmit neuron input values to the first memory area;
(iv) a second switching unit having a first state connecting the second memory area to the first data line to transmit neuron input values from the second memory area to the calculating means, and a second state connecting the second memory area to the second data line to transmit the neuron input values to the second memory area; and
(v) a third switching unit having a first state connecting the third memory area to the first data line to transmit neuron input values from the third memory area to the calculating means, and a second state connecting the third memory area to the second data line to transmit neuron input values to the third memory area;
in the first period of each cycle, the first switching unit is in the first state thereof and the second switching unit is in the second state thereof;
in the second period of each cycle, the second switching unit is in the first state thereof and the third switching unit is in the second state thereof; and
in the third period of each cycle, the third switching unit is in the first state thereof.

14. An information processing system according to claim 13, wherein, in the third period of each cycle, the first switching unit is the second state thereof.

15. An information processing system according to claim 13, further including control means connected to the first, second and third switching units to control the states thereof.

16. An information processing method to calculate output values for a multitude of neurons, each of the neurons having a plurality of inputs, the method comprising:

broadcasting input values for the neurons to a plurality of processing sections;

using each of the processing sections to calculate output values for a group of associated neurons, including
- (i) holding in each processing section, input values for the associated group of neurons,
- (ii) during a first period, using each processing section (a) to calculate a first series of neuron output values for the associated group of neurons, and (b) to broadcast said first series of neuron output values to the other processing sections, and
- (iii) during a second period, using each processing section (a) to calculate a second series of neuron output values for the associated group of neurons, and (b) to broadcast said second series of neuron output values to the other processing sections.

17. A method according to claim 16, wherein each neuron output value is calculated by only one of the processing sections.

18. A method according to claim 16, wherein:
each processing section includes first and second memory areas;
the holding step includes the step of
- (i) holding in the first memory area of each processing section input values used to calculate the first series of neuron output values for the associated neurons, and
- (ii) holding in the second memory area of each processing section input values used to calculate the second series of neuron output values for the associated neurons.

19. A method of operating a processing section of the type including a calculating means and a memory unit having first and second memory areas, the method comprising:

broadcasting input values to the processing section;
transmitting to the first memory area a first set of the broadcast input values;
storing each of the first set of the input values at an associated address in the first memory area;
transmitting to the second memory area a second set of the broadcast input values;
storing each of the second set of the input values at an associated address in the second memory area;
calculating a first series of output values during a first period, including
- (i) transmitting a multitude of addresses to the first memory area,
- (ii) transmitting to the calculating means, input values stored in the first memory area at said multitude of addresses, and
- (iii) processing the input values transmitted to the calculating means from the first memory area to derive said first series of output values; and calculating a second series of output values during a second period, including
- (i) transmitting a multitude of addresses to the second memory area,
- (ii) transmitting to the calculating means, input values stored in the second memory area at said multitude of addresses, and
- (iii) processing the input values transmitted to the calculating means from the second memory area to derive said second series of output values.

20. A method according to claim 19, wherein:
the step of transmitting the addresses to the first memory area includes the step of transmitting a set if addresses to the first memory area in a given order; and
the step of transmitting the addresses to the second memory area includes the step of transmitting said set of addresses to the second memory area in said given order.

* * * * *